Nov. 9, 1965  L. O. HEWKO  3,216,362
FLEXIBLE RING PUMP DRIVE DEVICE
Filed Oct. 14, 1963  3 Sheets-Sheet 1

INVENTOR.
Lubomyr O. Hewko
BY
George E. Johnson
ATTORNEY

Nov. 9, 1965     L. O. HEWKO     3,216,362
FLEXIBLE RING PUMP DRIVE DEVICE
Filed Oct. 14, 1963     3 Sheets-Sheet 2

INVENTOR.
Lubomyr O. Hewko
BY
George E. Johnson
ATTORNEY

Nov. 9, 1965        L. O. HEWKO        3,216,362

FLEXIBLE RING PUMP DRIVE DEVICE

Filed Oct. 14, 1963        3 Sheets-Sheet 3

INVENTOR.
Lubomyr O. Hewko
BY
George E. Johnson
ATTORNEY

United States Patent Office 3,216,362
Patented Nov. 9, 1965

3,216,362
FLEXIBLE RING PUMP DRIVE DEVICE
Lubomyr O. Hewko, Warren, Mich., assignor to General Motors Corporation, Detroit, Mich., a corporation of Delaware
Filed Oct. 14, 1963, Ser. No. 316,015
8 Claims. (Cl. 103—123)

This invention relates to a unit useful either as a pump, a speed changing device or as a combination of a pump and a speed changing device and, more particularly, to a unit taking the form of a positive displacement rotary action pump device, capable of pumping either one or several different fluids simultaneously or several proportions of the latter.

Heretofore, positive displacement pumps of the rotary type have often been characterized by a substantial loss in efficiency due to friction and also leakage of the fluid between the pump housings and the rotors. Also, severe pressure pulsations and objectionable noises have been experienced in the use of such pumps.

An object of the present invention is to provide a pump drive device characterized by a minimum of operational friction, leakage and noise, and capable of serving solely as a single or multifluid pump, as a speed reducer or step-up unit, or as a combination of a pump and speed changing device.

A feature of the present invention is a housing enclosing a ring composed of a flexible hard material, this ring being adapted to be undulated or distorted from its released cylindrical form into a pumping space within the housing by rolling elements of a sun and planet arrangement thereby to force fluid through the housing.

This and other important features of the present invention will now be described in detail in the specification and then pointed out more particularly in the appended claims.

Figure 1:
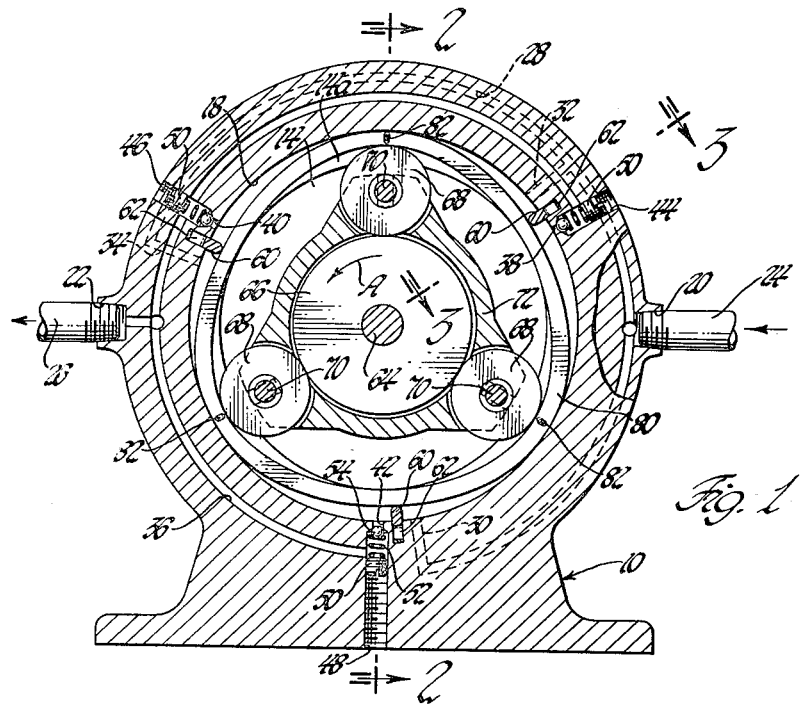
FIGURE 1 is a sectional view through a pump forming one embodiment of the present invention with pump displacement being exaggerated in order more clearly to illustrate the operation.

In FIGURE 1, a pump housing is indicated at 10. This housing includes two side plates 12 and 14 as well as an intermediate housing portion 16 which is bored to define a cylindrical chamber 18. Conveniently, the housing portion 16 is recessed appropriately to receive shoulder portions 12a and 14a of side plates 12 and 14. Portion 16 also is provided with a threaded inlet at 20 on one side and a threaded outlet 22 diametrically opposite thereto.

To the inlet and outlet are fixed inlet and outlet pipes 24 and 26 respectively. An arcuate passage 28 is formed in the portion 16 and is concentric with the center line of the cylindrical wall of the chamber 18. This passage 28 is connected to the inlet 20 and communicates with three radial passages 30, 32, and 34 which extend to the chamber 18. Another arcuate passage is shown at 36 as being in the portion 16 and this passage connects three valve ports 38, 40, and 42 with the outlet 22. Each of these ports leads through the wall of the chamber 18 and is coaxial with a larger threaded bore 44, 46, or 48. In each of these bores is located a stop screw 50 which in turn retains a coil spring 52 in engagement with a ball 54 so that the latter tends to close the corresponding port.

Three vanes 60 are slidably and radially mounted in the housing portion 16 and they are each urged inwardly by a leaf spring 62 retained in a suitable slot of the housing. The vanes are evenly spaced around the chamber 18.

A shaft 64 is journaled in the two side plates 12 and 14 of the housing and is fixed to a sun or central roller 66 the cylindrical surface of which engages three planet rollers 68. Each of the latter is journaled on a shaft 70 the ends of which bear flat surfaces as at 71 to be retained by radial slots 74 in a carrier 72. The slots permit assembly of the pump as will further appear and carrier 72 encompasses the sun or central rollers 66.

The cylindrical surface defining the chamber 18 within the housing is in the form of a smooth cylindrical bore. Within this bore is inserted a belt-like ring 80 of hard, flexible material with an outside diameter, while undistorted, slightly less than the inside diameter of the chamber 18. Before deflection or distortion, the ring 80 will fit around the rollers 68 but, with the insertion of the sun 66 between the rollers 68, the ring 80 will be distorted or undulated firmly to contact the housing surface at three spaced points or line contact areas. The ring 80 is non-rotatably held within the housing by six pins 82 which extend from the side plates 12 and 14 into radial slots 84 formed in the ring 80. Three equal and crescent shaped pumping spaces are created by the distortion of the ring 80 between the rollers 68 and the cylindrical surface of the chamber 18. The radial length of each slot 84 must exceed the radial displacement of the ring 80.

Figure 2:
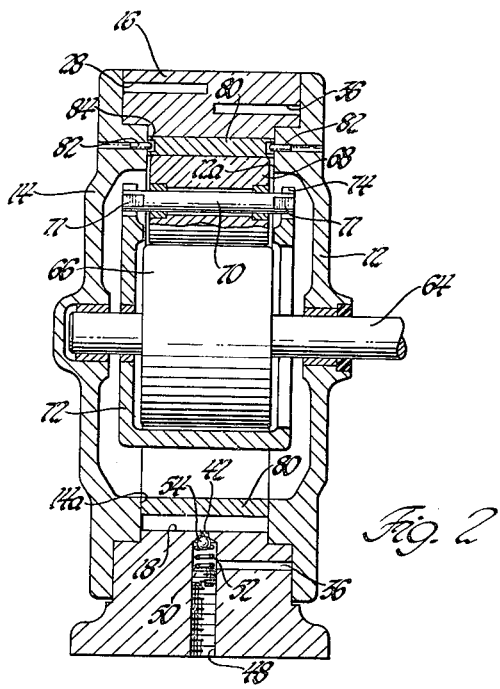
FIGURE 2 is a sectional view looking in the direction of the arrows in FIGURE 1.
Figure 3:
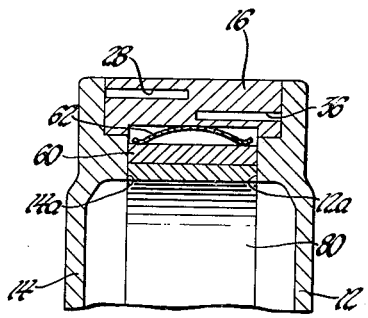
FIGURE 3 is a sectional view looking in the direction of the arrows 3—3 in FIGURE 1, the sun and planet arrangement being omitted.

In operation of the pump shown in FIGURES 1 to 3 inclusive, it being assumed that a source of fluid supply is available by way of the pipe 24, the fluid will be drawn into the crescent shaped pumping spaces then with rotation of the shaft 64 the distortion of the ring 80 will be such as to discharge the fluid by way of the valve controlled ports 38, 40, and 42 into the arcuate channel 36 to the discharge pipe 26. The planet carrier is rotated in the direction of the arrow A shown in FIGURE 1 and the crescent shaped pumping spaces will also rotate with respect to the housing even though the ring 80 itself, being held by the pins 82, does not rotate. With the radial vanes 60 urged by the spring means 62 into contact with the full width of the ring 80, any fluid trapped in a given crescent space will be compressed as a planet roller approaches the appropriate vane 60. As the pressure increases, the spring 52 in back of the corresponding check valve ball 54 will yield and the fluid will be discharged as above stated. Simultaneously with this action, that portion of the crescent shaped space ahead of the same vane 60 will be under vacuum sufficient to cause a suction from the inlet passage and will, therefore, fill up with new fluid until the next planet or roller 68 approaches that particular volume of new fluid. Exactly the same events happen as each of the planet rollers 68 passes by each of the three vanes. As a result, for the one carrier revolution, each planet roller 68 works each of the vanes 60 three times and, therefore, for three planet rollers an equivalent of nine crescent volumes of fluid are forced through the pump. There is no sliding motion taking place between the ring 80 and the housing 10 on the one hand and the vane 60 and the housing on the other except for a relatively minor radial motion of the ring and vane due to the ring distortion or deflection wear losses. Wear losses will be small as a pure rolling action under a relatively low normal load between the inside diameter of the ring 80 and the planet rollers as well as between the sun roller and the planet rollers. As heretofore stated the ring distortion or pump displacement is exaggerated in the drawings. Actually the distortion or deflection is preferably of a small magnitude such as a few thousands of an inch. This small deflection magnitude and rigidity of the ring make opssible the generation of very high pressures by the pump.

For high pump pressure and low fluid discharge volume, the ring 80 should be made of steel. With requirements being met by low pump pressure and high discharge volume, the ring could be made of a more flexible material such as rubber or plastic but in each case the ring should be of such rigidity as to maintain an arcuate configuration between the planet rollers or balls if either form of rolling elements are used. Each vane such as the vane 62 is placed in proper relation to an inlet port and an outlet port for cooperative action as will be understood.

The costruction of the embodiment shown in FIGURES 1, 2 and 3 requires small manufacturing tolerances to make the pumping action effective, but, if desired, the opposite flat sides of the ring 80 may be fitted with an O-ring or some other type of sealing means.

Figure 4:
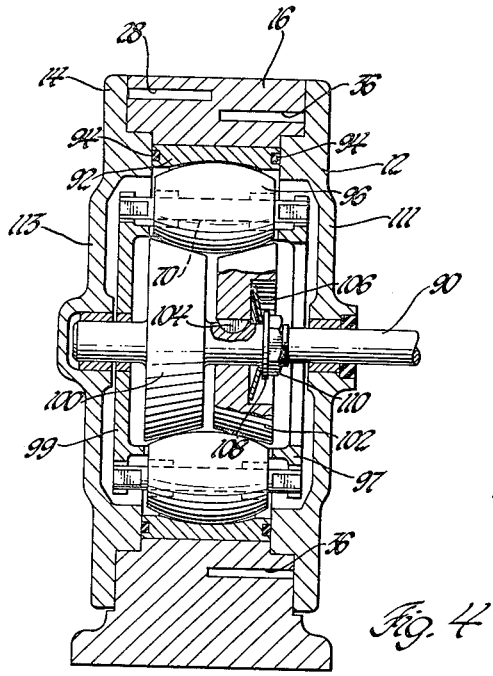
FIGURE 4 is a view similar to that of FIGURE 2 but showing a modified form of construction.

In FIGURE 4, the housing portion 16 as well as side plates 12 and 14 are again employed, also a shaft 90 is utilized to rotate a carrier included in a sun and planet arrangement. In this instance, however, a different form of ring 92 is substituted for the ring 80 but this ring 92 is also distorted to form crescent pumping spaces. In order to prevent leakage by the ring 92, O-rings 94 are utilized in recesses formed in the opposite and flat sides of the ring. The inner surface of the ring 92 is made to fit a curved barrel-like form of special planet rollers 96. Each of these rollers is mounted on a shaft 70 held on a carrier of two facing plates 97 and 99. In place of a single sun roller, two frusto-conical rollers 100 and 102 converging toward each other are utilized. The frusto-conical surfaces of these two rollers are arranged to cooperatively engage the planet rollers 96. The sun roller 100 is integral with the shaft 90 whereas the sun roller 102 is keyed as at 104 to the shaft but free to move axially on the shaft under the force exerted by a spring washer 106. The latter is held in place on the shaft by a washer 108 and nut 110 on the shaft.

The pump of FIGURE 4 has a distinct advantage in that it provides a built-in over-pressure protection. If the outlet pressure for any reason becomes too high, it is automatically released to a required extent by virtue of the action of the excess pressure forcing the planet rollers 96 radially inwardly against the resistance of the spring 106. This opens a leak on the pressure part half of a crescent space to the neighboring suction half of the crescent space. When the overpressure condition ceases to exist, the pump picks up the load automatically. Locking pins, such as the pins 82 of FIGURE 1, are not essential in this modification as the ring 92 can be kept from rotating by producing an excess radial force between the ring and the housing bore. A slight creep of the ring can be tolerated without adverse effects. The side plates 111 and 113 are therefore not recessed to carry such pins.

Figure 5:
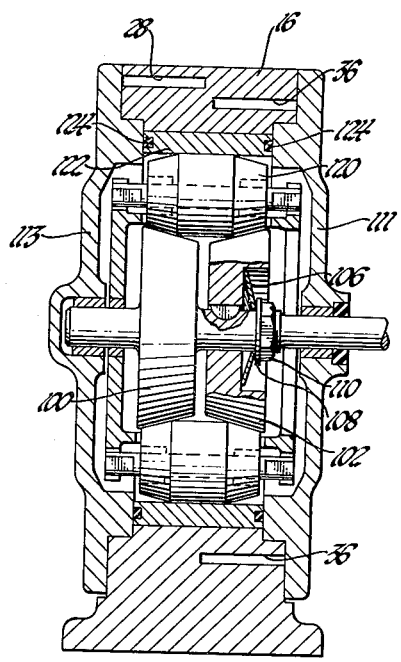
FIGURE 5 is a sectional view showing another alternative construction.

The construction illustrated in FIGURE 5 is similar to that of FIGURE 4 except that planet rollers 120 of a different shape are utilized in combination with a suitable and distortionable ring 122 which is much like the ring 80 except that O-rings 124 are provided to prevent leakage by the ring. As in FIGURE 4, the loading of the spring 106 is adjustable by the nut 110 to secure the desired pump pressure level or to take up wear.

Figure 6:
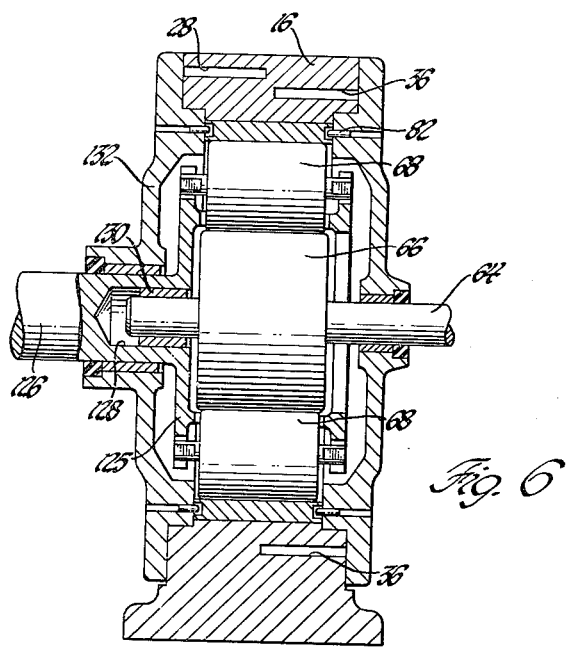
FIGURE 6 is a sectional view similar to that of FIGURE 2 but modified to show a speed changing device.

In FIGURE 6, a structure much like that of FIGURE 2 is illustrated but in this instance the carrier 125 is modified to be integral with a second shaft 126 which is coaxial and rotatable with relation to the shaft 64. The shaft is recessed as at 128 to receive a bushing 130, and a side plate 132 is substituted for the side plate 14 and is made with a large opening to accommodate the shaft 126. With this modification, a speed reducing or increasing device is provided depending upon shaft 64 or shaft 126 being used as an input shaft.

Figure 7:
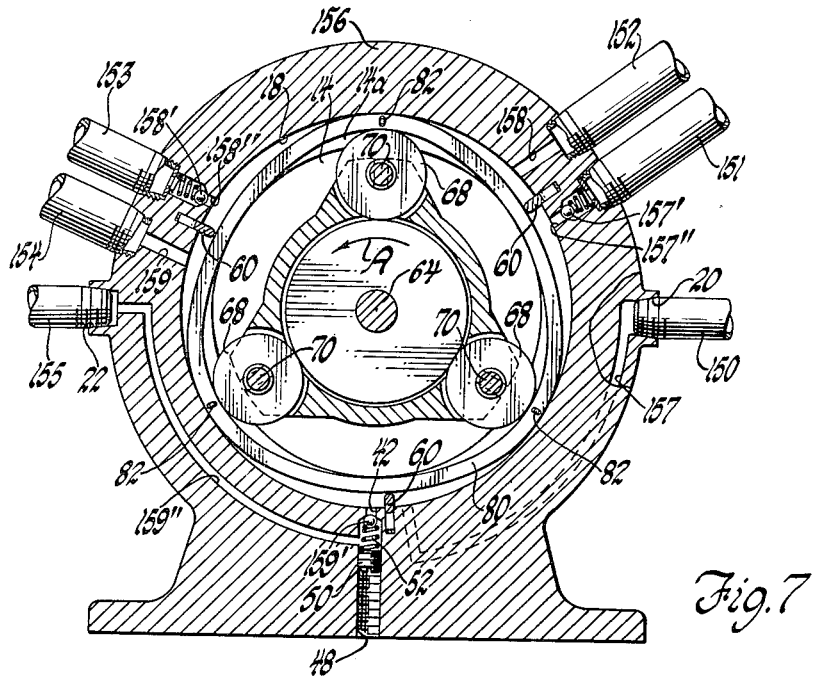
FIGURE 7 is a sectional view similar to FIGURE 1 but showing a pump for multi-fluid (three) pumping operation.

The Belleville spring 106 in FIGURE 4 or FIGURE 5 could be replaced by a hydraulic or pneumatic piston. In such an event, the pump could be unloaded without requiring declutching or stopping of the driving motor—a useful feature in applications where pump pressure is needed intermittently. In FIGURE 7 a pump structure is shown capable of pumping three different fluids simultaneously. This is done simply by separating inlet and outlet ports in such a way that each crescent space pumps only one kind of fluid using an outlet port and the preceding inlet port, as shown. Since there are three pairs of such ports or connections 150–151, 152–153, and 154–155, three separate fluids can be pumped simultaneously and in exactly equal quantities. In short, if each suction part of the crescent is fed different liquid, then each outlet port will discharge different liquid. If all three outlet ports are joined together, then the discharged liquid will be a mixture of equal parts of the three inlet fluids. Similarly, a 2:1 mixture can be obtained by having two crescent spaces pump the same fluid, and the third crescent to pump a different fluid, etc. This mode of possible operation may be quite useful in industrial chemical processes, especially since interconnecting of various ports can be done externally to produce various pumping ratios. Also, the total pumped volume of fluid can be regulated by simply shunting the ports of one or two crescent spaces as desired.

Some parts of the FIGURE 7 version are the same as shown in FIGURE 1 and are indicated by the same reference characters but the pump housing 156 is different in having inlet passages 157, 158 and 159 with corresponding outlet valves 157', 158' and 159' with suitable outlet passages 157", 158" and 159" to accommodate three different liquids or three proportions of liquid as above mentioned.

Figure 8:
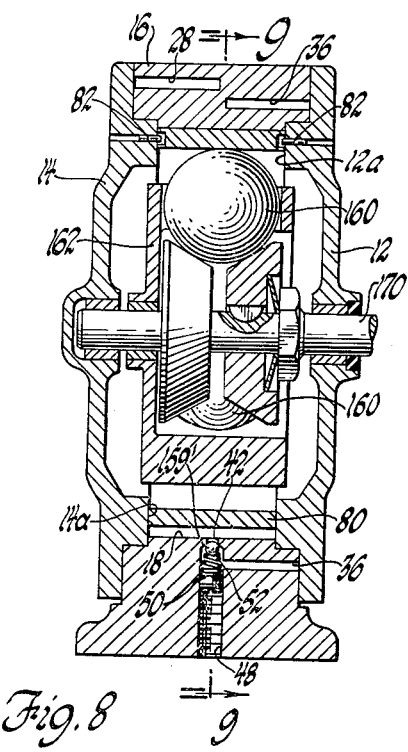
FIGURE 8 is a sectional view of a greatly simplified pump wherein planets are plain, shaftless spheres.
Figure 9:
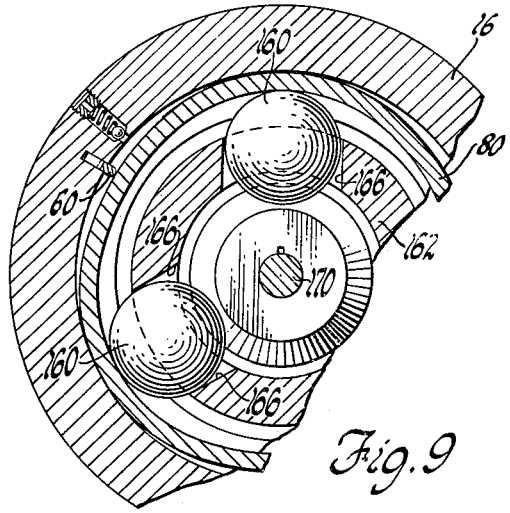
FIGURE 9 is a sectional view through FIGURE 8 looking in the direction of arrows 9—9, showing the carrier construction.

FIGURES 8 and 9 show a pump mechanism very similar to the previously described except that the planets are round balls 160 spaced 120° apart by a simple separator (carrier) 162. This version of the pump is considerably cheaper and easier to manufacture since no planet shafts and carrier slots are required. The operation of sun axial loading mechanism is the same as shown in FIGURES 4 and 5.

FIGURE 9 is a section of FIGURE 8 viewed in the direction of arrows 9, showing the simplicity of the planets and carrier. The carrier 162 serve only to keep the planets equally spaced. The planets 160 fit into three radial holes 166 of the carrier, and the latter is supported by bearings coaxial with the sun shaft 170. The ball pump version can be used as either a monofluid or a multi-fluid device and also can become a speed reducer-pump combination by making the carrier 162 an output member and the sun an input member in a way similar to FIGURE 6. The separator holes 166 then are preferably lined with bearing material to reduce sliding losses between the separator and the balls.

I claim:
1. A device comprising a housing, an operating shaft extending into said housing, the latter having a space with a cylindrical wall coaxial with and facing said shaft, a sun and planet arrangement structure connected to said shaft for rotation thereby and including a carrier, a flexible hard ring surrounding said sun and planet structure and distorted by the latter from an initial circular form into contact with said wall, said sun and planet arrangement structure including planet rollers, a sun roller, and spring means urging the latter against said planet rollers, vanes slidably mounted in said housing and contacting the full width of said hard ring, ports in said housing arranged in spaced relation along said wall, and two of said ports being located between adjacent vanes.

2. A device comprising a housing, a space in the latter having a cylindrical wall, a sun and planet arrangement structure in said space and including a carrier and planet rollers retained by the carrier, at least one sun roller engaging said planet rollers, two shafts coaxial with said space and journaled in said housing, one of said shafts being fixed to said sun roller, the other of said shafts being fixed to said carrier, a flexible hard ring surrounding said sun and planet arrangement structure and distorted by the said planet rollers into contact with said wall at spaced areas of the latter, vanes slidably mounted in said housing and contacting the full width of said hard ring, ports in said housing arranged in spaced relation along said wall, two of said ports being located between adjacent vanes, one of said shafts being adapted to rotate said carrier, and the other of said shafts being adapted to rotate said sun roller.

3. A device comprising a housing, a chamber in said housing having an outer wall, a rotatable sun and planet arrangement structure in said chamber and cooperating with said housing in defining a space surrounding said arrangement structure, a flexible hard ring distorted a few thousandths of an inch outwardly by said arrangement structure into contact at spaced points with said outer wall to define pump displacement spaces, said ring being characterized by sufficient rigidity to maintain an arcuate configuration between said spaced points, a vane for each of the latter slidably mounted in a radial direction with respect to said housing and biased inwardly into contact with said ring across the full width of the latter, inlet and outlet ports alternately arranged in pairs along said outer wall with each pair being adapted to communicate with one of said pump displacement spaces consecutively upon rotation of said sun and planet arrangement structure, and means for rotating said arrangement structure whereby each vane is moved radially in said housing.

4. A device comprising a housing, an operating shaft extending into said housing, the latter having a space wall coaxial with and facing said shaft, a sun and planet arrangement structure fixed to said shaft for rotation thereby, a flexible hard ring surrounding said sun and planet arrangeemnt structure and distorted by the latter from a circular form into contact with said space wall to form pumping chambers, spring loaded vanes slidably mounted in said housing and traversing spaces existing between said space wall and said hard ring, said ring having sufficient rigidity to remain arcuate in form against the pressure of said vanes and any fluid in said chambers, ports in said housing arranged in spaced relation along said space wall, and two of said ports being located between adjacent vanes and adapted to serve as a fluid inlet port and a fluid outlet port.

5. A device comprising a housing defining a chamber with an outer wall, a sun and planet arrangement structure arranged for power rotation in said chamber, a flexible hard ring distorted outwardly a few thousandths of an inch by said arrangement structure and into contact at spaced areas with said outer wall to cooperate with the latter in defining crescent shaped fluid displacement spaces, a vane for each of said spaces slidably mounted in said housing and extending inwardly and resiliently into contact with the full width of said ring, said ring having sufficient rigidity to remain arcuate against each of said vanes and fluid pressure in said spaces, and ports arranged along said outer wall to communicate with said displacement spaces as inlet and outlet ports.

6. A device comprising a housing defining a chamber with an outer wall, a sun and planet arrangement structure in said chamber including a rotatable carrier with a sun roller and planet elements, a flexible metal ring distorted outwardly from circular form by said planet elements and into contact with said outer wall, said ring having sufficient rigidity between adjacent planet elements to sustain fluid pressure developed between said ring and outer wall, sliding vanes in said housing contacting the full width of said distorted ring, inlet and outlet ports alternately arranged along said outer wall, and means for rotating said sun and planet arrangement structure whereby said vanes are moved by said ring.

7. A device comprising a housing, an operating shaft extending into said housing, the latter having a space with a cylindrical wall coaxial with said shaft, a sun and planet arrangement structure journaled on said shaft for rotation relative thereto and including a carrier, a flexible hard ring surrounding said sun and planet arrangement structure and distorted by the latter into contact with said wall at spaced areas, said sun and planet arrangement structure including planet balls, vanes slidably mounted in said housing and contacting the said hard ring, said ring having sufficient rigidity to remain arcuate between said spaced areas and against fluid pressure developed between said ring and cylindrical wall, inlet and outlet ports in said housing arranged in spaced relation around said wall, and pressure actuated one-way valve means in said outlet ports, and means for rotating said sun and planet arrangement structure.

8. A device comprising a housing defining a chamber with an outer wall, a sun and planet arrangement structure in said chamber including a rotatable carrier, a flexible hard ring distorted outwardly by said sun and planet arrangement structure into contact at spaced areas with said outer wall, means for holding said ring against rotation, sliding vanes in said housing each yieldingly contacting the full width of said distorted ring, said ring being self-sustaining between said areas against forces acting inwardly against the ring, inlet and outlet ports arranged along said outer wall and adapted to conduct multiple fluids, each of said inlet ports being placed to cooperate with one of said outlet ports and two of the adjacent vanes to guide the flow of one of said multiple fluids, and means for rotating said sun and planet arrangement structure whereby said vanes are moved radially by contact with said ring.

References Cited by the Examiner

UNITED STATES PATENTS

| 1,983,033 | 12/34 | Hutchison | 103—122 |
|---|---|---|---|
| 2,693,766 | 11/54 | Seyler | 103—149 |
| 2,885,966 | 5/59 | Ford | 103—149 |
| 2,922,378 | 1/60 | Pabst | 103—130 |

FOREIGN PATENTS

| 981,992 | 1/51 | France. |
|---|---|---|
| 266,467 | 4/50 | Switzerland. |

KARL J. ALBRECHT, *Primary Examiner.*

WILBUR J. GOODLIN, *Examiner.*